US008725603B1

(12) United States Patent
Harman et al.

(10) Patent No.: US 8,725,603 B1
(45) Date of Patent: May 13, 2014

(54) METHOD AND SYSTEM FOR FACILITATING MANAGEMENT OF PAYCHECK DISBURSEMENTS

(75) Inventors: Susan A. Harman, San Diego, CA (US); Alan Tifford, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 610 days.

(21) Appl. No.: 12/244,471

(22) Filed: Oct. 2, 2008

(51) Int. Cl.
*G06F 17/22* (2006.01)
*G07F 19/00* (2006.01)
*G07B 17/00* (2006.01)
*G06Q 40/00* (2012.01)

(52) U.S. Cl.
USPC .............................. 705/31; 705/30; 705/36 T

(58) Field of Classification Search
CPC ............................. G06Q 10/10; G06Q 40/02
USPC ...................................................... 705/30, 31
See application file for complete search history.

(56) References Cited

U.S. PATENT DOCUMENTS

| 5,673,402 | A  | * | 9/1997 | Ryan et al. | 705/38 |
|---|---|---|---|---|---|
| 7,761,370 | B1 | * | 7/2010 | Hicks et al. | 705/38 |
| 7,797,211 | B1 | * | 9/2010 | Reeth et al. | 705/35 |
| 8,423,435 | B1 | * | 4/2013 | Poteet et al. | 705/32 |
| 2001/0044756 | A1 | * | 11/2001 | Watkins et al. | 705/26 |
| 2002/0022982 | A1 | * | 2/2002 | Cooperstone et al. | 705/7 |
| 2002/0042771 | A1 | * | 4/2002 | Shields et al. | 705/37 |
| 2002/0184148 | A1 | * | 12/2002 | Kahn et al. | 705/40 |
| 2002/0188535 | A1 | * | 12/2002 | Chao et al. | 705/35 |
| 2003/0197055 | A1 | * | 10/2003 | Ben-Aissa | 235/379 |
| 2004/0049436 | A1 | * | 3/2004 | Brand et al. | 705/30 |
| 2005/0086211 | A1 | * | 4/2005 | Mayer | 707/3 |
| 2005/0209903 | A1 | * | 9/2005 | Hunter et al. | 705/9 |
| 2010/0030610 | A1 | * | 2/2010 | Gomeh | 705/9 |
| 2010/0106638 | A1 | * | 4/2010 | Allison et al. | 705/38 |

OTHER PUBLICATIONS

University of Baltimore, Net Pay Calculator, http://web.archive.org/web/20060523173617/https://interactive.marylandtaxes.com/extranet/cpb/paychkcalc/PayChkCalc.aspx.*

* cited by examiner

*Primary Examiner* — Ig T An
(74) *Attorney, Agent, or Firm* — Park, Vaughan, Fleming & Dowler LLP

(57) ABSTRACT

A method and system are provided for helping a user configure her paycheck deductions and disbursements. Paycheck information is retrieved (e.g., from an aggregator, from benefits providers, from the user) and a tool is activated to present an electronic paycheck summary to the user. A tax engine is invoked to determine whether her net pay can be increased by reducing the amount of pay withheld for taxes. The user is then invited to change any or all of the benefit deductions taken from her pay. For example, she may be invited to select from a number of insurance plans (e.g., medical, dental, life insurance), select a level of contribution to a retirement account, open an investment account, and so on. Action to implement some or all of the user's selected deductions may then be initiated electronically. Alternatively, she may be presented with a checklist of actions she needs to take.

9 Claims, 13 Drawing Sheets
(10 of 13 Drawing Sheet(s) Filed in Color)

METHOD AND SYSTEM FOR FACILITATING MANAGEMENT OF PAYCHECK DISBURSEMENTS

RELATED ART

The subject matter of this application is related to the subject matter in a co-pending non-provisional application by the same inventors as the instant application, entitled "Method and System for Populating Tax Returns Using Aggregated Data," which has Ser. No. 11/774,090 and was filed Jul. 6, 2007.

BACKGROUND

Many employees live "paycheck to paycheck," meaning that they usually fully expend one paycheck by the time the next is received. Because the full amounts of their paychecks are quickly consumed, they naturally wish to receive the maximum amount of net pay they are entitled to.

However, many employees' paychecks are not optimized so as to yield the maximum amount of value. For example, an employee who regularly receives a tax refund from the US Treasury or a state government probably has too much tax being withheld—money that he or she could use during the year instead of having to wait until his or her tax return is processed. Similarly, an employee may be paying more than necessary for benefits, or may not be utilizing benefits that best suit their needs—such as medical insurance, dental insurance and so on, and may be able to receive similar coverage for less money or may be able to save money by using a Flexible Spending Account (FSA) or Health Spending Account (HSA) for healthcare needs.

Other employees that may not be living paycheck to paycheck may still be disadvantaged by a poor choice of benefit elections and paycheck disbursements. For example, they may not be maximizing their 401K contributions, may not be electing or paying for adequate health insurance for their growing family, etc.

In short, many employees' paychecks may involve payments, deductions and/or other disbursements that are unsuitable or inadequate for their actual needs. Because of the limited information often provided to employees with their paychecks, they may be unaware of the problem. Although their physical paycheck may indicate their gross pay, net pay and some summary of the deductions, there is no indication as to whether a given deduction could be reconfigured to increase the net pay, or what the potential changed paycheck could look like if it were reconfigured.

In addition, changing an employee's deductions or disbursements is not a trivial task. In addition to the likelihood that an employee may not even be aware of the details of a given deduction, there may be a plethora of options available for the employee to research (e.g., different insurance plans, different withholding options) and the administrative procedures involved in making changes make take some time.

Human resources personnel are typically prohibited from suggesting one course of action over another (e.g., choosing between insurance plans or investment options, selecting a W4 withholding value), thereby leaving an employee to make important decisions all alone. Also, an employee cannot easily determine how a change to one disbursement will affect her bottom line (i.e., net pay) until the change has been implemented and a new paycheck is issued.

Thus, for various reasons, from the difficulty of fully understanding the disbursements of a paycheck, through the complexity involved in choosing among disbursement options and the uncertainty of the effect that a particular change will have, many employees receive paychecks that could be better tailored to their needs (e.g., to increase their net pay).

SUMMARY

In an embodiment of the invention, a method, system and user interface are provided for assisting an employee in seeing the impact of potential adjustments to his or her paycheck deductions or disbursements, before such adjustments are made. In this embodiment, deductions include tax withholding, insurance premiums (e.g., medical, dental, vision, life), retirement contributions (e.g., 401K), investments (e.g., direct stock purchases), disbursements for housing, and so on.

In some embodiments of the invention, paycheck information is retrieved from some source (e.g., an employer, a benefits solution vendor, a payroll company, a benefits provider, a financial institution, the employee), and a tool is activated to present an electronic paycheck summary. A tax engine is invoked to determine whether the net pay can be increased by reducing the amount of pay withheld for taxes, in which case the projected paycheck summary is updated accordingly.

The employee is then invited to evaluate and potentially change any or all of the deductions and disbursements from her pay. For example, she may be invited to select from a number of insurance plans (e.g., medical, dental, life insurance), select a level of contribution to a retirement account, open an investment account, and so on. She may be invited to describe her needs in order to determine which plans or options are most appropriate (e.g., medical conditions of her dependents, fixed liabilities for housing and/or other purposes).

Action to implement some or all of the user's selected deductions may then be initiated electronically, or she may be presented with a checklist of actions she needs to take. She can then take that checklist to her human resources department, or use it herself to take the necessary action.

The patent or application file contains at least one drawing executed in color. Copies of this patent or patent application publication with color drawing(s) will be provided by the Office upon request and payment of the necessary fee.

DESCRIPTION OF THE FIGURES

FIGS. 3A-J are views of a graphical user interface for facilitating management of paycheck deductions, in accordance with some embodiments of the present invention.

DETAILED DESCRIPTION

Figure 1:
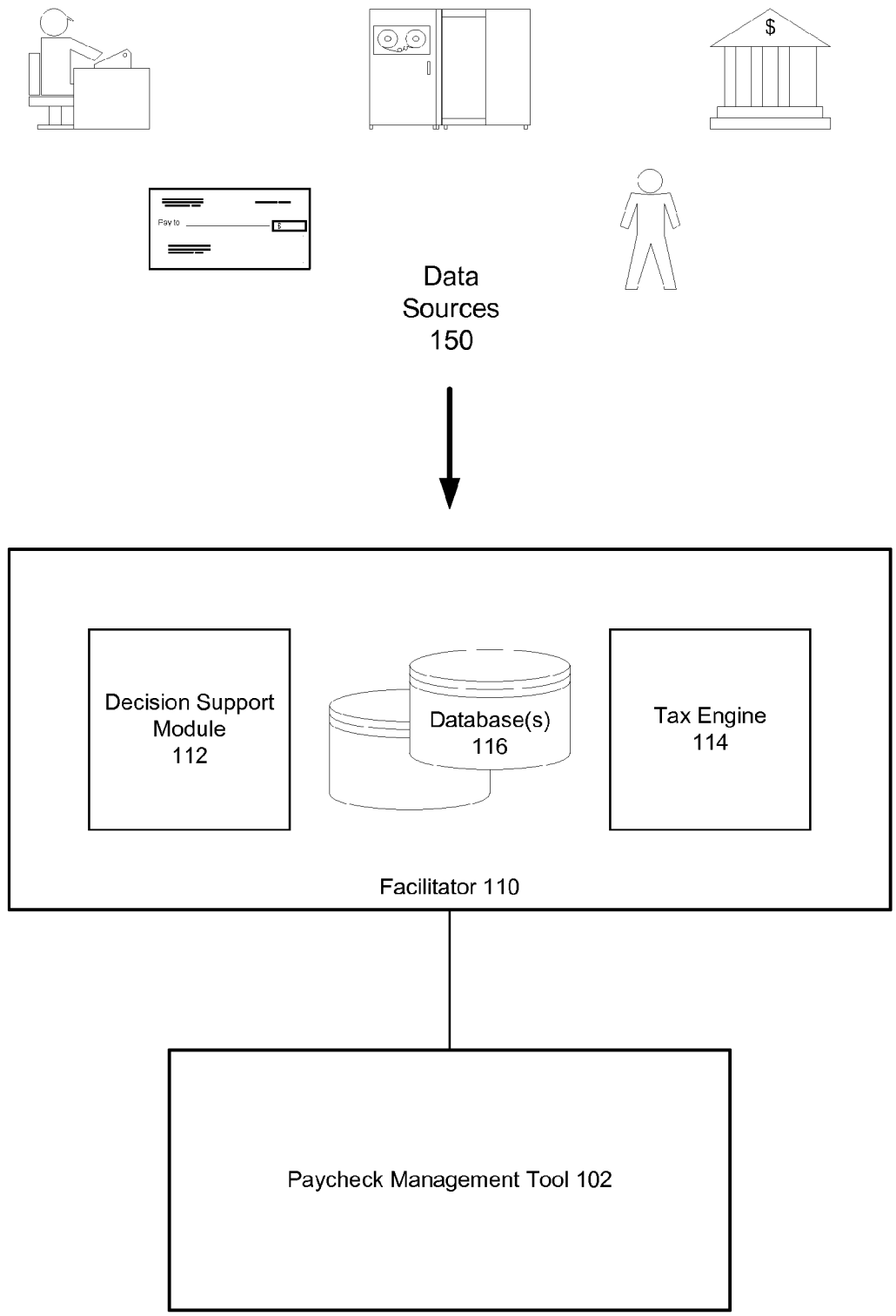
FIG. 1 is a block diagram depicting a system for facilitating management of paycheck deductions in accordance with some embodiments of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In embodiments of the invention described herein, a method, system and user interface are provided to facilitate an employee's management and optimization of his or her paycheck deductions or disbursements. Such disbursements may be for tax withholding, insurance premiums (e.g., medical, dental, vision, life), retirement (e.g., 401K), investments (e.g., direct stock purchases), savings, and/or other benefits or purposes.

In some embodiments, a method of facilitating the management of an employee's paycheck deductions begins by presenting the employee with an electronic view of her current paycheck. The view shows how her current paycheck is configured (e.g., gross pay, total deductions, net pay), and allows her to access more detailed information regarding the various deductions or disbursements. As described below, she will be able to immediately see the effect of changing a deduction (e.g., increasing or decreasing her tax withholding, selecting a different insurance plan, increasing her contribution to an investment). In particular, she will be able to immediately see how her net pay will change.

For some or all types or categories of paycheck deductions, current disbursements from her paycheck are detailed so that she can see precisely how much is being deducted and the purpose of each deduction. Also, the system may determine whether too much income tax is being withheld from her pay. If too much tax is being withheld, she is informed as to the amount by which her net pay could be increased each pay period.

She can also investigate the deductions to determine if she could or should change them. For example, she may decide that she is paying too much for medical or dental insurance and may wish to choose a different plan, or may realize that she needs a better or more comprehensive plan. She can examine the various options within a category, and the view of her paycheck will automatically change to show how her deductions and net pay would change.

For example, for each type of medical benefit—medical insurance, dental insurance, vision insurance, FSA (Flexible Spending Account), HSA (Health Spending Account), etc.— one or more plans or programs for which she is eligible may be presented. Each plan could be accompanied by a description of the coverage and the cost (e.g., monthly deduction from her paycheck, yearly payment, amount of co-pay), as well as the potential out-of-pocket costs based on the employee's potential medical needs. She can therefore easily identify options that provide appropriate coverage, as well as options that yield additional take-home pay and, hopefully, one or more options that provide adequate coverage while improving her bottom line.

In some embodiments of the invention, a tool for facilitating employees' management of their paycheck deductions may be made available to them by their employer. In these embodiments, an employee may access the tool via a benefits website, an intranet, a kiosk or other computer system or network operated or sponsored by his employer. In these embodiments, data for populating views of his paycheck, for describing deduction options and for showing the effect of changing a deduction or disbursement may reside on computer systems operated by the employer or by a third party that maintains the data for the employer (e.g., an aggregator), and this data is electronically submitted to a facilitator such as Intuit, Inc., for calculating and presenting the paycheck and benefit options to the employee.

Other embodiments of the invention may be used without any interaction with an employer. For example, a service provider or product provider such as Intuit, Inc. may offer a tool online, via the Internet. In these embodiments, a user submits data for use (and possible retention) by the tool, such as gross pay, tax withholding, potential health elections and insurance costs, retirement contributions, and so on. She may also authorize data to be pulled from personal accounts at financial institutions or other benefit provider sources. Use of the tool to optimize her deductions will be limited to the type and amount of information she supplies. If the user elects to allow the service provider to retain the data, he can return to the tool at a later time and continue managing his deductions without having to re-enter his data.

FIG. 1 is a block diagram of a system for helping an employee manage her paycheck deductions and disbursements, according to one embodiment of the invention.

In this embodiment, an employee invokes paycheck management tool 102 to view and manage her paycheck disbursements and deductions. The tool may be installed as a plug-in or add-on to a browser program (e.g., Internet Explorer, Firefox), or may be a stand-alone application program. As described above, the tool may be provided by her employer, by an aggregator configured to aggregate various employee information on behalf of her employer (e.g., including some or all payroll and deduction data), or some other entity.

Tool 102 communicates with facilitator 110, which comprises decision support module 112, tax engine 114 and one or more databases 116. Decision support module 112 is configured to assist the employee in making decisions regarding management of her paycheck. For example, it will describe to her different options for a particular type of deduction (e.g., different medical insurance plans, different levels of contribution to a retirement account), and show how adoption of a particular choice would affect her paycheck.

Tax engine 114 determines whether her tax withholding could be adjusted to increase her take-home pay. For example, by considering the amount of tax refunded to her in the previous tax year, if any, the tax engine can calculate whether and how much her net pay can or should be modified by adjusting her withholding. Tax engine 114 may therefore suggest she increase her withholding to improve her net pay (if she received a refund), or decrease her withholding if she had to pay additional tax with her tax return (or if she prefers to receive a refund).

In different embodiments of the invention, tax engine 114 may differ in complexity and robustness. For example, the tax engine may be capable of partially or fully composing a user's tax return.

In different embodiments of the invention, databases 116 may store different collections of data for an employee, depending on the degree to which the employee is able to manage her paycheck via tool 102. More specifically, a provider of tool 102 (e.g., the employee's employer, an online service provider) may limit the employee's ability to manage or optimize her paycheck to some subset of the deductions or disbursements taken from her paycheck.

In some embodiments of the invention, information that may be stored by facilitator 110 and/or used by tool 102 includes, but is not limited to, the following types or categories of deductions and disbursements:

- demographic (e.g., marital status, age, address, family size);
- payroll (e.g., gross pay, deductions);
- family income (e.g., total household income);
- childcare/education (e.g., expenses for childcare and/or education);

contributions (e.g., charitable contributions);
employer stock participation (e.g., employee stock participation plan);
bank accounts (e.g., direct deposit details, bank account numbers);
housing (e.g., rent, mortgage);
retirement (e.g., 401K, Individual Retirement Account);
health benefits (e.g., plans for which she is eligible, the plan she is
currently subscribed to);
insurance other than health (e.g., car insurance, life insurance);
investments (e.g., stocks, bonds, annuities); etc.

This information may be stored temporarily, permanently or semi-permanently in databases 116. The data may be received as needed from data sources 150, which may include the employee's employer, an aggregator used by the employer to provide information to employees, a tax preparer, financial services providers, benefits providers (e.g., health insurer), banks, and so on.

Illustratively, the data sources may periodically submit data regarding the employee to facilitator 110. Conversely, the facilitator may dynamically request such data on a periodic basis or when the employee invokes tool 102.

In some embodiments of the invention, facilitator 110 is the employee's employer or an aggregator selected by the employer. In other embodiments the facilitator is another party, such as Intuit, Inc. or another provider of online financial services.

The amount and type of data provided to facilitator 110 by data sources 150 for use by an employee operating tool 102 may depend upon the mode of use of the tool. In one embodiment of the invention, use of tool 102 is supported or sponsored by the employee's employer. In this mode, most or all of the data related to her paycheck deductions are drawn from facilitator 110 and/or data sources 150 as needed. The employee need not produce the information.

However, in another embodiment of the invention, tool 102 is used by an employee for whom little or no paycheck deduction data is available at facilitator 110 and/or data sources 150. Illustratively, the employee may be employed by a company that has not embraced usage of the tool or electronic provision of benefits services to its employees. Or, the employee may be self-employed or simply not wish to rely upon an existing repository of her paycheck information.

In this embodiment, the employee submits some or all of her paycheck information or arranges with one or more data sources to provide relevant information to the facilitator. The employee may choose to have the information retained by the facilitator, may download it to her own computing device, or may prefer to have it discarded after using the tool.

In some embodiments of the invention, tool 102 is made available by a financial services entity (acting as facilitator 110) with which an employee already has a relationship—such as an online tax preparation service or a provider of financial software (e.g., accounting, personal financial management). In these embodiments the tool can be populated with whatever paycheck information the financial service entity maintains (e.g., tax data, retirement account information, investments), with or without her employer's cooperation. She can then provide other information manually or import it from her employer or her employer's aggregator, or may export data from the financial service entity to another facilitator that has access to other paycheck data.

Figure 2:
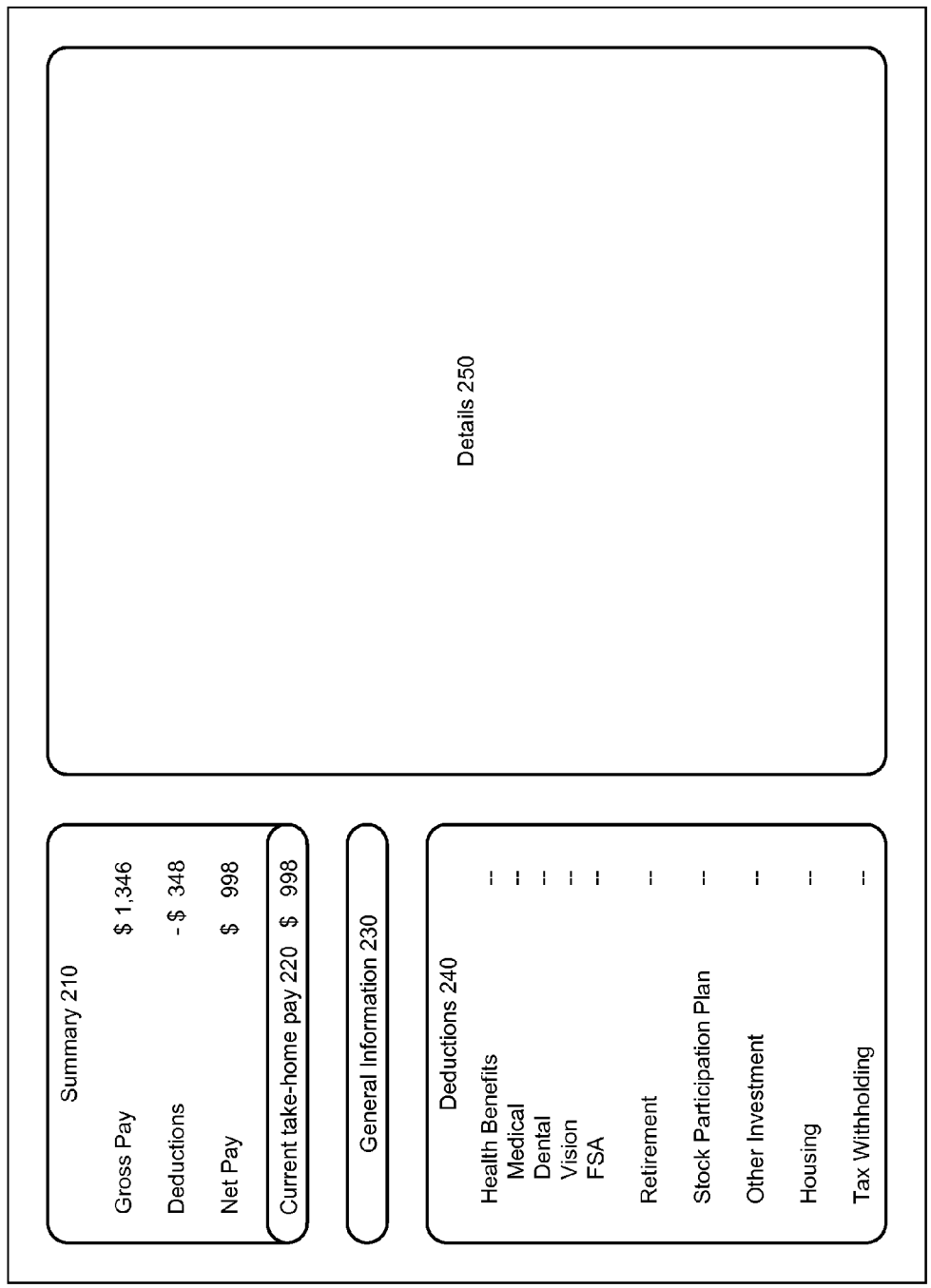
FIG. 2 is a block diagram of a graphical user interface for facilitating management of paycheck deductions, in accordance with some embodiments of the present invention.

FIG. 2 represents a graphical user interface employed by a tool for facilitating an employee's management of his paycheck, according to one embodiment of the invention. Other user interfaces having varying degrees of similarity to interface 200 may be derived from the following description without exceeding the scope of the invention. In some embodiments of the invention, user interface 200, or the tool that uses interface 200, may be termed a "paycheck optimizer" to reflect its role in helping the employee optimize his paycheck deductions.

In this embodiment of the invention, user interface 200 comprises various windows for displaying information regarding the employee's paycheck. As the employee proceeds through the process of viewing and/or tentatively adjusting paycheck deductions, the information is updated to reflect how his paycheck would be altered. At any time, he can clear the display, reset it to reflect his current actual paycheck, or roll back one or more tentative adjustments. Various controls for taking such actions (not shown in FIG. 2) may be provided.

Some details common to one or more implementations of the user interface are omitted for the sake of clarity—such as employee name, employee position, various controls (e.g., to print the information, to refresh the display, to save the data, to clear changes, to login or logout), etc. Also, in some embodiments of the invention, any or all windows of user interface 200 may be merged, collocated, or further subdivided.

In the illustrated embodiment of the invention, summary window 210 displays a summary of the employee's paycheck, such as gross pay, total deductions and resulting net pay. As the employee investigates other deduction options, as discussed below, summary window 210 may be updated to reflect how the total deductions and net pay would change if the options were adopted.

In the illustrated embodiment of the invention, current take-home pay window 220 provides a static view of the employee's current take-home pay. Specifically, the indicated value does not change as the employee investigates other deduction options, so that he can easily compare his current take-home pay with the adjusted value that would result from selecting those options.

General information window 230, in this embodiment of the invention, presents personal or demographic information regarding the employee. For example, selecting or opening this window may reveal (e.g., in details window 250) updateable information regarding his family (e.g., spouse, number and names of dependents, age, dates of birth).

Not all information in information window 230 (or other windows) need be populated, but the presentation of some deduction options may depend upon the available or verified employee information. For example, if the family information for the employee indicates that he is single and has no dependents, when options for medical insurance are presented family-type plans may or may not be offered.

Deductions window 240 lists deductions the employee can investigate via the tool. In particular, he can select a deduction category to view his options (if any) and tentatively select one to see details of that option and learn how it would affect his paycheck (e.g., his net pay). Deductions the employee can investigate are not limited to those depicted in FIG. 2, and may include any or all deductions currently taken from his pay. Information presented in deductions window 240 may scroll, so that any number of deductions may be presented.

In some embodiments of the invention, tax withholding (i.e., withholding for federal and/or state income tax) is treated as a deduction as shown in FIG. 2, but is not shown in user interface 200. In these embodiments, the employee can select this category of deduction to investigate how changes to his withholding (e.g., changing from 4 dependents to 5) would change his net pay.

In some other embodiments of the invention, however, the tool automatically determines whether he could increase his net pay by changing his withholding. In these embodiments, the tool includes or has access to a tax engine that is configured to calculate some or all parts of a tax return. If data regarding the employee's previous tax return(s) is available (e.g., to determine if he received a refund), the tax engine can be used to calculate whether changing his withholding will allow that refund to be retained in his paycheck.

Details window 250 presents further information regarding a category of deduction or other information item selected by the employee. The window may also present context-sensitive help if needed or desired.

In one method of the invention in which user interface 200 or a similar user interface is employed, the employee selects (e.g., clicks on) a deduction category in deductions window 240 to see, in details window 250, a list of options for that deduction. For example, if he selects Health Benefits/Vision, a list of vision plans for which he is eligible will be presented. The list may be sorted by cost (e.g., monthly deduction, yearly premiums, co-pay amount), level of benefits, or other criteria.

Illustratively, the employee may be asked to identify his priorities regarding paycheck deductions—such as lowest monthly cost, lowest out-of-pocket expenses (e.g., co-pay amounts for doctor visits), best coverage or most benefit, etc. Deduction options may then be ranked or presented based on his priorities.

In some embodiments of the invention, after the employee has selected a new paycheck configuration (i.e., a different set of deductions), he may initiate some or all of the changes electronically via user interface 200 and the tool. The extent to which changes may be initiated electronically may depend on the level of integration between the tool (or the provider of the tool) and the entities responsible for implementing the changes (e.g., an insurance carrier, a bank, the employer).

In other embodiments of the invention, the employee may print a report or other representation of his optimized or altered paycheck configuration and take it to his human resources department (or other office responsible for making changes), and/or forward it to them electronically. For example, when the employee activates a particular control (not shown in FIG. 2), the tool may print a checklist identifying the actions he needs to take to implement the changes. These actions may include completing a new W-4 form to change his withholding, enrolling in a different insurance plan, filling out an application for a 401K retirement account, etc.

FIGS. 3A-J are screenshots showing one implementation of graphical user interface 200 as it may be used to navigate an employee's deductions and help him optimize his paycheck.

Figure 3A:
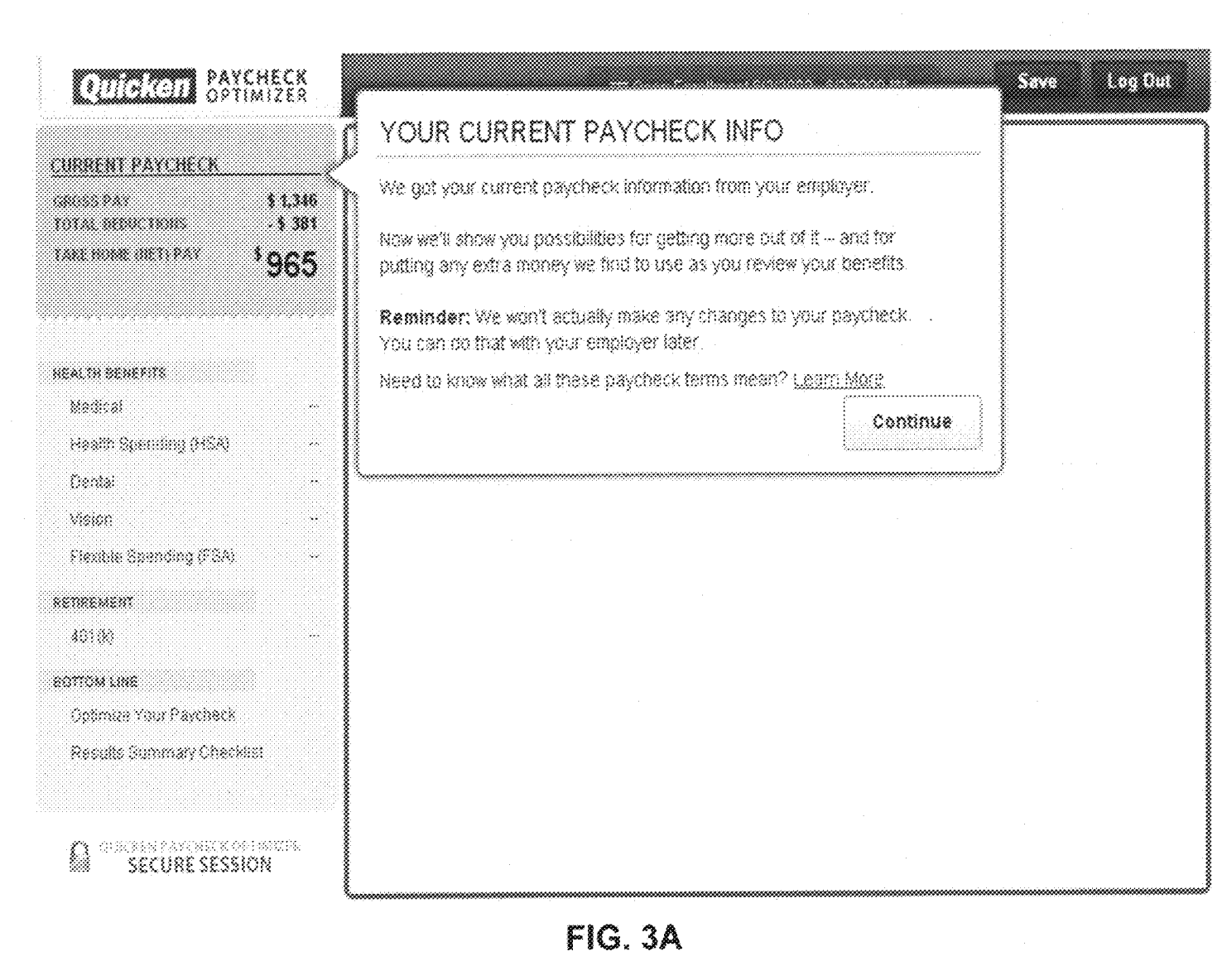

FIG. 3A demonstrates a view of the interface as it may be configured after the paycheck optimization tool has retrieved the employee's paycheck data. The employee's paycheck is summarized in a summary window that reports gross pay, total deductions and resulting net pay. The tool may retrieve paycheck data from a tool facilitator (e.g., facilitator 110 of FIG. 1), an aggregator associated with the employee's employer, the employer, the employee, one or more benefit providers and/or other sources. In an embodiment of the invention in which the employee interactively submits his paycheck data, the tool may elicit that data before continuing the process of helping the employee to optimize his paycheck.

Figure 3B:
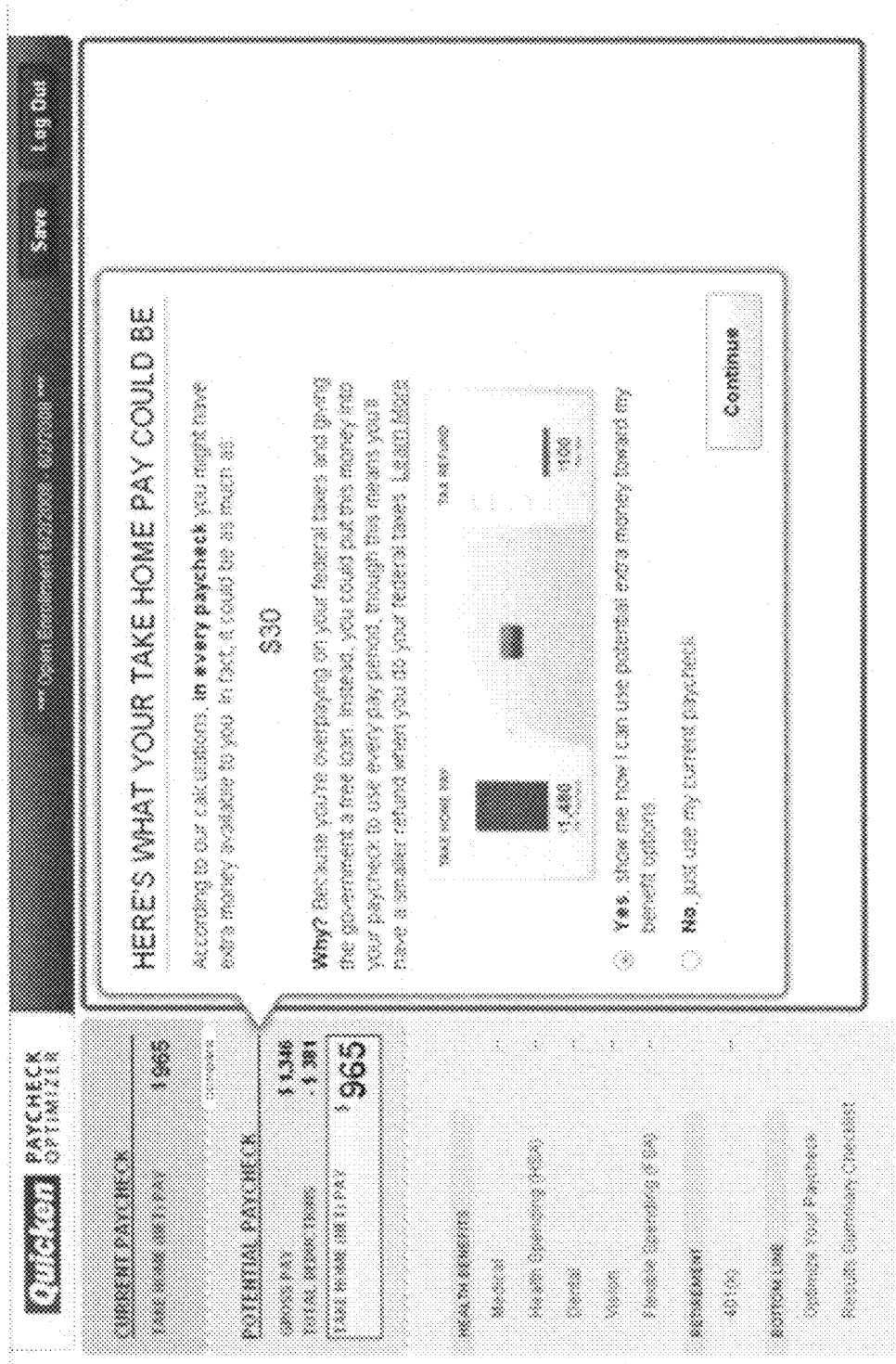

FIG. 3B demonstrates a view of the user interface as it reports the discovery of additional take-home pay (i.e., $30) the employee can capture by adjusting (e.g., increasing) the number of dependents claimed for tax withholding purposes. The employee may or may not choose to capture the extra pay; if he chooses to capture it, the summary window will be updated with the new net pay amount (as can be seen in FIG. 3C).

Specifically, a tax engine module of the tool (or a tax engine coupled to the tool) may examine the employee's past tax return(s), or process his current tax information, and determine whether he received or will receive a refund. If so, the tax engine may calculate whether the employee could change his withholding to allow him to keep those excess tax payments in his paycheck.

FIG. 3B also shows the use of a separate reminder or current take-home pay window, on the left side of the interface, that reminds the employee (possibly throughout the optimization process) of his current take-home pay. The summary window will now be used to dynamically summarize his potential future paycheck as he reconfigures it via the optimization process.

Figure 3C:
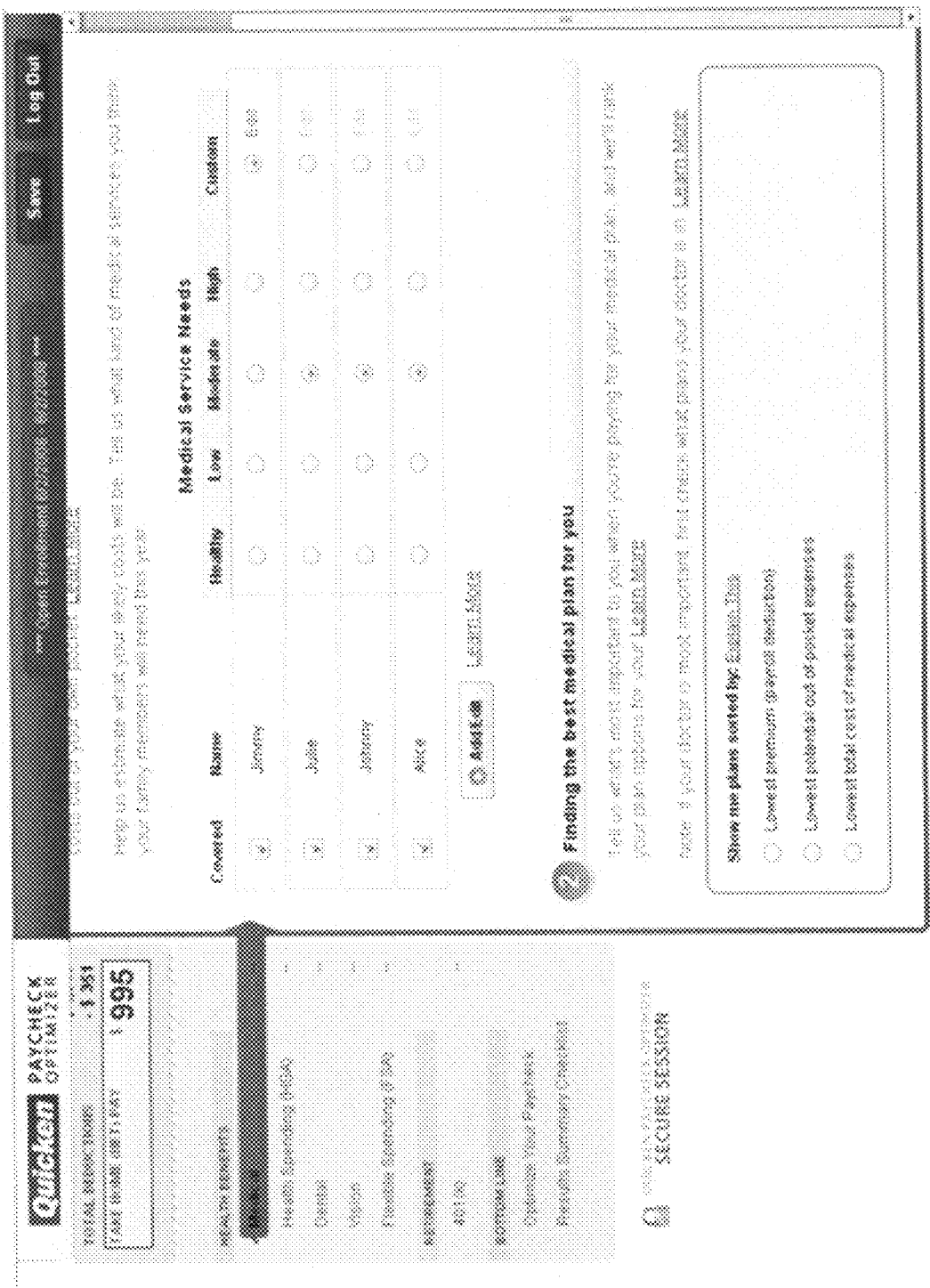

In FIG. 3C, the process of optimizing the employee's paycheck deductions begins by opening the medical portion of the health benefits deduction and eliciting an estimate of the employee's anticipated medical insurance needs. In this implementation of the tool, the employee is able to choose a level of medical care that he expects his family to need. Illustratively, he may be able to select a general level for each family member (e.g., low, medium, high) and/or provide more detailed information to define a custom level of need.

In a lower portion of the details window in FIG. 3C, the employee may be offered the ability to prioritize criteria for selecting a medical insurance plan. For example, he may be asked to choose which factor is most important to him—lowest total costs, lowest paycheck deduction or lowest out-of-pocket expenses (e.g., co-pays for doctor visits, prescriptions).

Also in FIG. 3C, the tool reveals to the employee in the summary window how much his net pay will increase by changing his withholding. In particular, his deductions have been reduced and his take-home (net) pay has increased by $30. Alternatively, the employee may have indicated a desire to receive a tax refund, in which case the deductions and net pay would remain the same as in FIG. 3B.

Figure 3D:
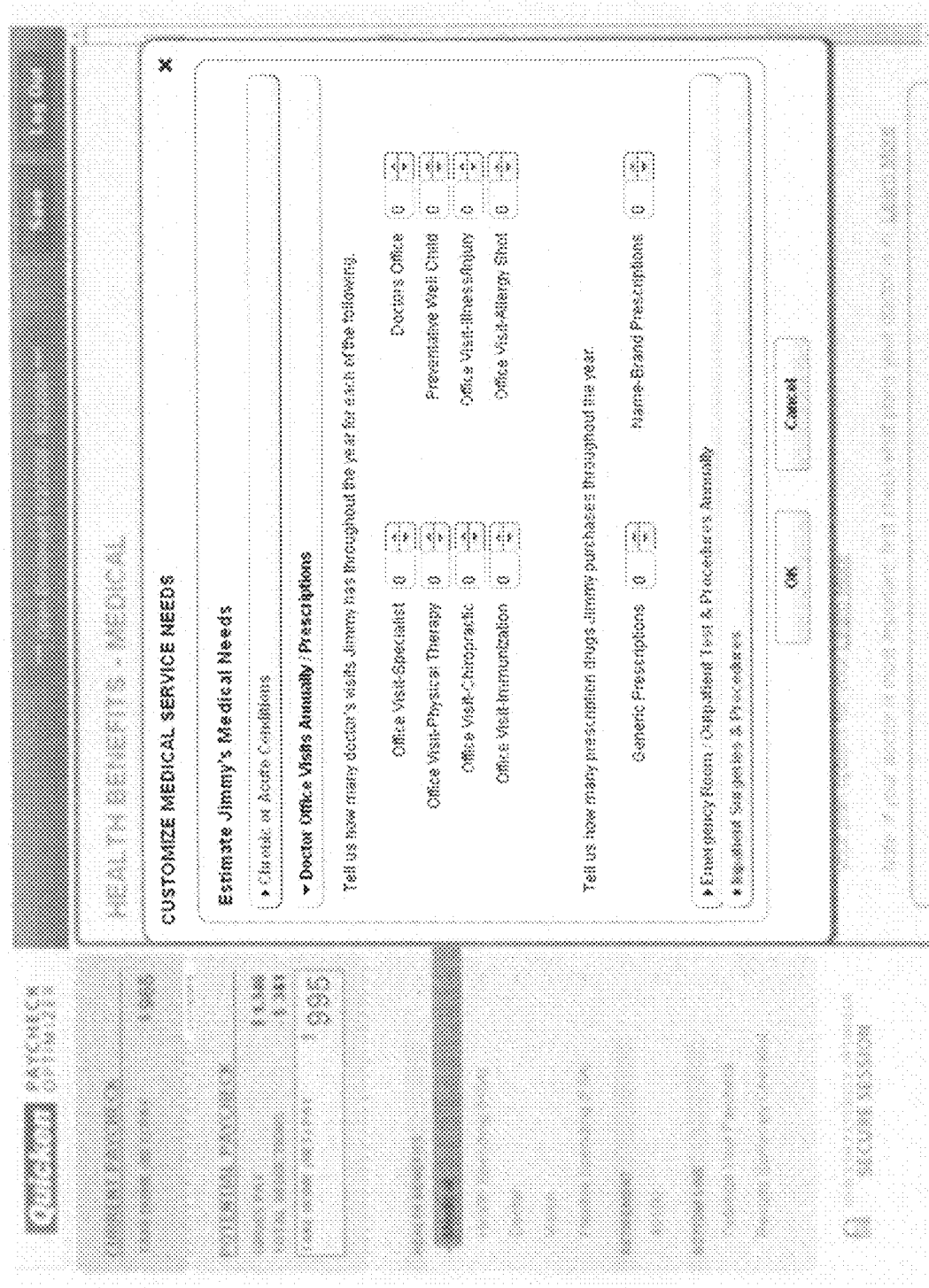

FIG. 3D illustrates how a custom level of need for medical coverage may be defined for a family member after selecting "custom" for that member's medical service needs in the interface view of FIG. 3C. In FIG. 3D, a four-part window is opened with partitions for (a) Chronic or Acute Conditions, (b) Doctor Office Visits Annually/Prescriptions, (c) Emergency Room/Outpatient Tests & Procedures Annually, and (d) Inpatient Surgeries & Procedures.

Within the "Chronic or Acute Conditions" partition, for example, the employee may be prompted to identify conditions afflicting the subject family member (e.g., asthma, diabetes, orthopedic impairments). Within the "Doctor Office Visits" partition (open in FIG. 3D), he may be asked to predict the number of consultations the family member will need in the next year (or, instead, possibly the number of consultations made in the preceding year).

In the "Emergency Room/Outpatient Tests & Procedures" partition, the employee may predict the number of tests or procedures the family member will need (or reports the number performed)—such as CT (computed tomography) scans, ultrasound scans, X-rays, outpatient emergency room visits, normal deliveries, etc. In the "Inpatient Surgeries & Procedures" partition, the employee predicts or reports on other procedures (e.g., delivery by Caesarean section, knee replacement, heart bypass surgery).

Figure 3E:
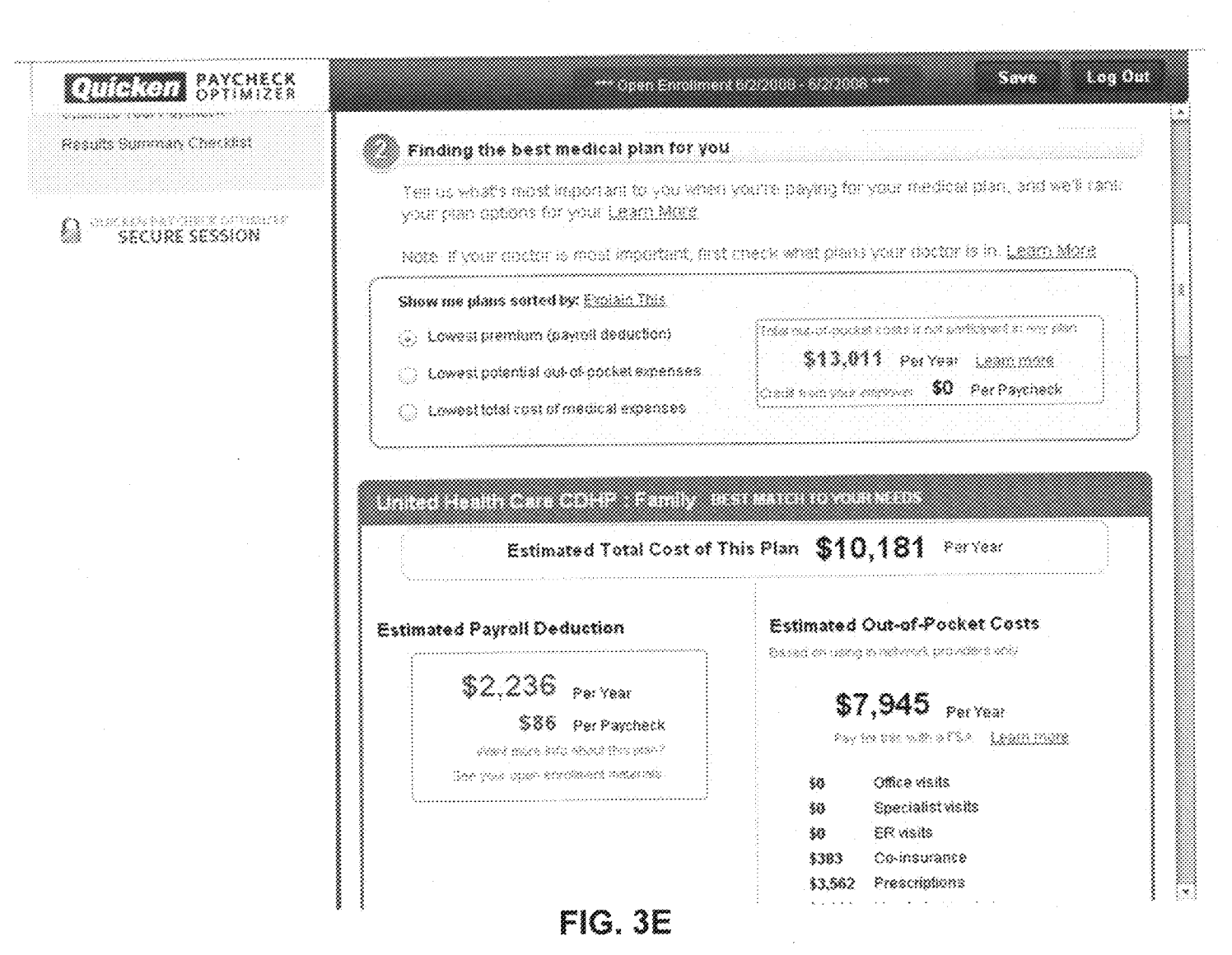

In FIG. 3E, the details window of the user interface displays one or more medical insurance options that are suitable for the employee based on his input, job and/or other factors. Depending on the number of plans that are suitable and that the employee is eligible for, he may need to scroll to see them all (as shown in FIG. 3E). The plans may be accompanied by information estimating their yearly cost, premiums, any deductible, estimated co-pay amounts, etc. Controls are provided to allow him to select a particular plan, obtain more information regarding a particular plan, view definitions of certain terms, sort the plans for presentation, etc.

Figure 3F:
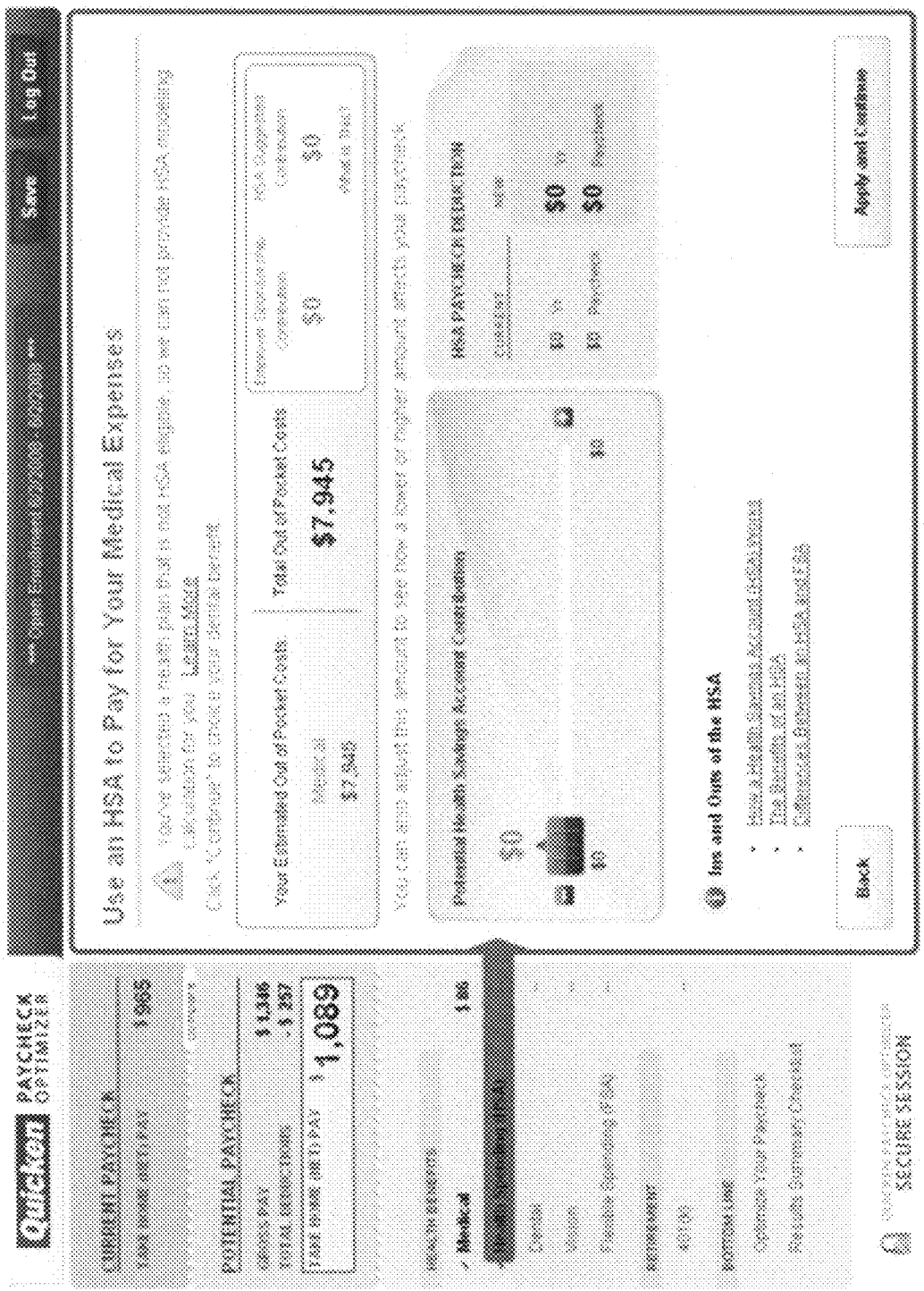

FIG. 3F demonstrates the effect on the employee's paycheck (in the summary window) of his choice of medical plan. In this case his take-home pay has increased, which indicates that the monthly deductions for the selected plan are less than his previous medical plan premiums.

Also, in FIG. 3F the employee is offered the opportunity to investigate the impact of setting up a Health Spending Account (HSA) to help with his healthcare costs. However, in the illustrated embodiment of the invention, the health plan selected by the employee is not compatible with use of an HSA account. If the employee were eligible for an HSA, he could select a possible contribution to the account and quickly see the impact to his paycheck in the summary window.

In an embodiment of the invention, after selecting a medical benefits plan and configuring an HSA contribution, the employee is offered opportunities to select or configure dental and vision plans, similar to the manner in which medical plan benefits were configured.

Figure 3G:
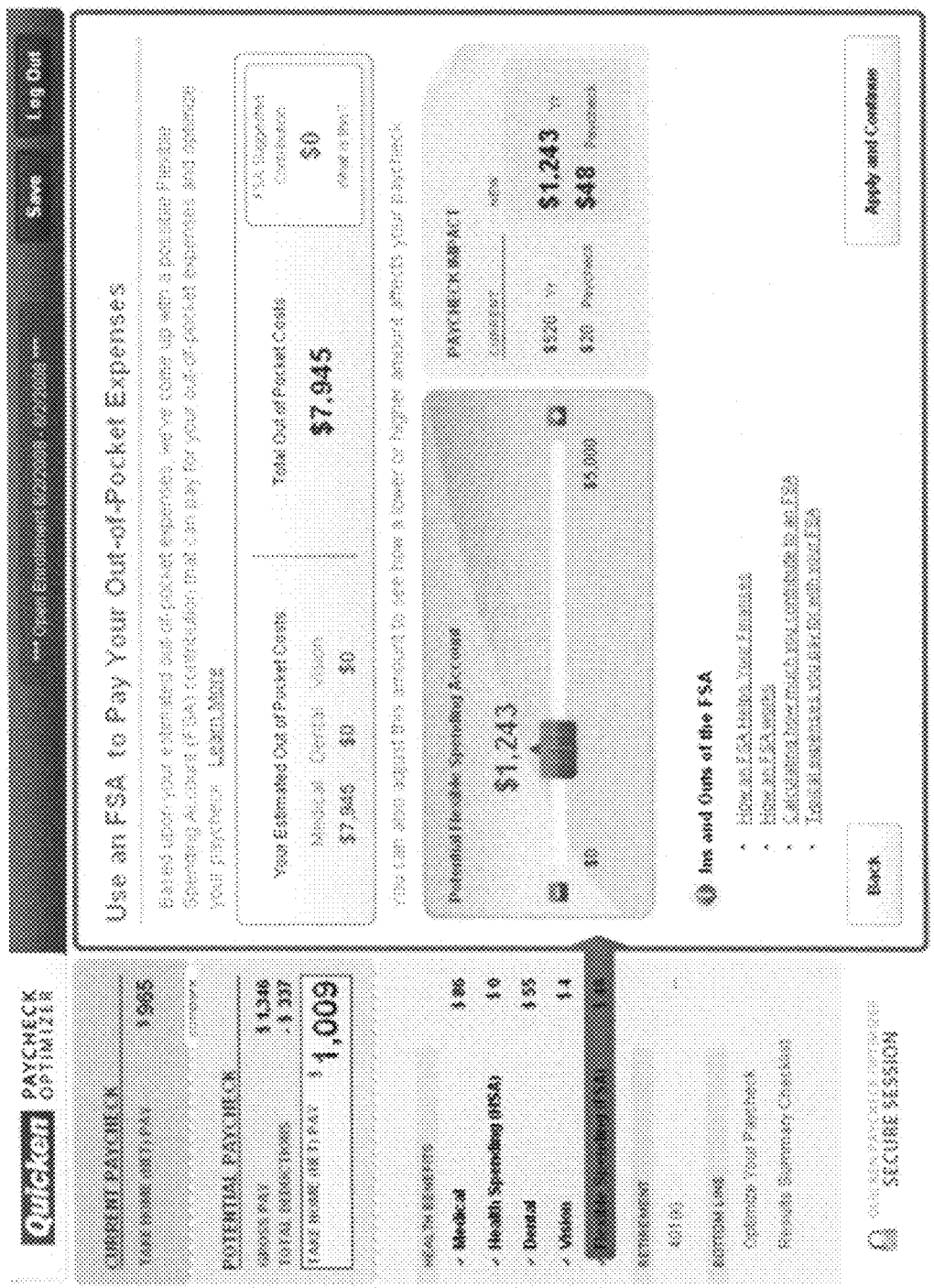

In FIG. 3G, the employee has selected desired medical, dental and vision plans, and is now offered the opportunity to investigate the impact of setting up a Flexible Spending Account (FSA) to help with his healthcare costs. In the details window he may set a potential contribution level with the slider tool and see how the potential contribution compares to his existing contribution. And, the summary window may automatically be updated to show what his new take-home pay would be, based on his configuration of other deductions (e.g., for health plans) and the FSA contribution.

Note that not all deductions may be configurable with the tool in all embodiments of the invention. For example, it can be seen in FIG. 3G that the total cost of the Health Benefits disbursements does not match the total deductions reported in the summary window. Some deductions (e.g., for spousal support or child support, legal judgments, mortgage payment) may be included in the total amount without being viewable or configurable via the tool.

Figure 3H:
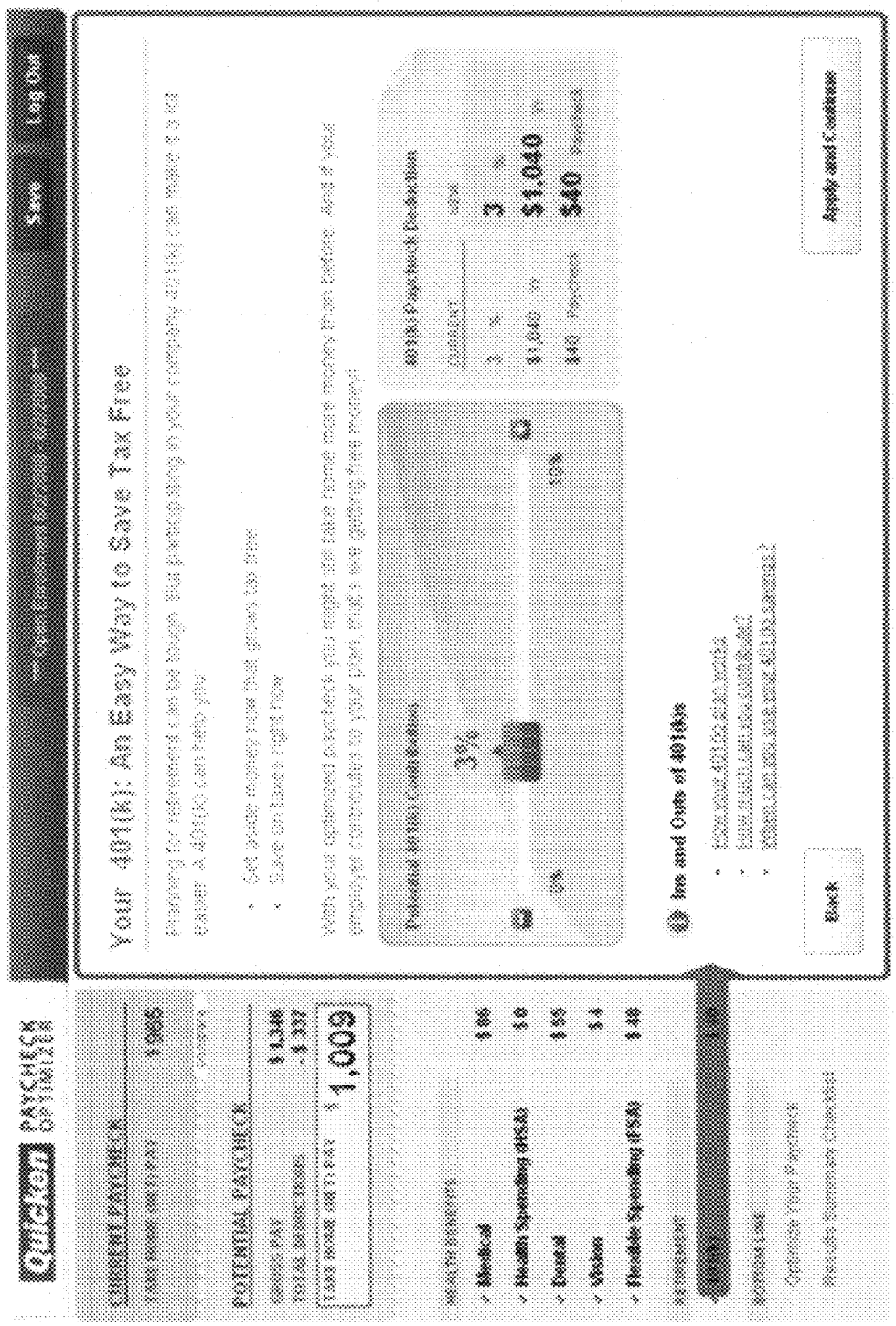

FIG. 3H illustrates a view of the interface in which the employee is offered the opportunity to set or change a contribution to a 401K retirement account. In particular, he may set a contribution percentage (a percentage of his gross pay), compare it to his previous level of contribution (if any) and immediately view the impact on his paycheck. Although not illustrated, any 401K contribution the employee selects may be reflected in the summary window. For example, if the contribution is made from pre-tax money, it may reduce the reported take-home pay without increasing the reported deductions.

Figure 3I:
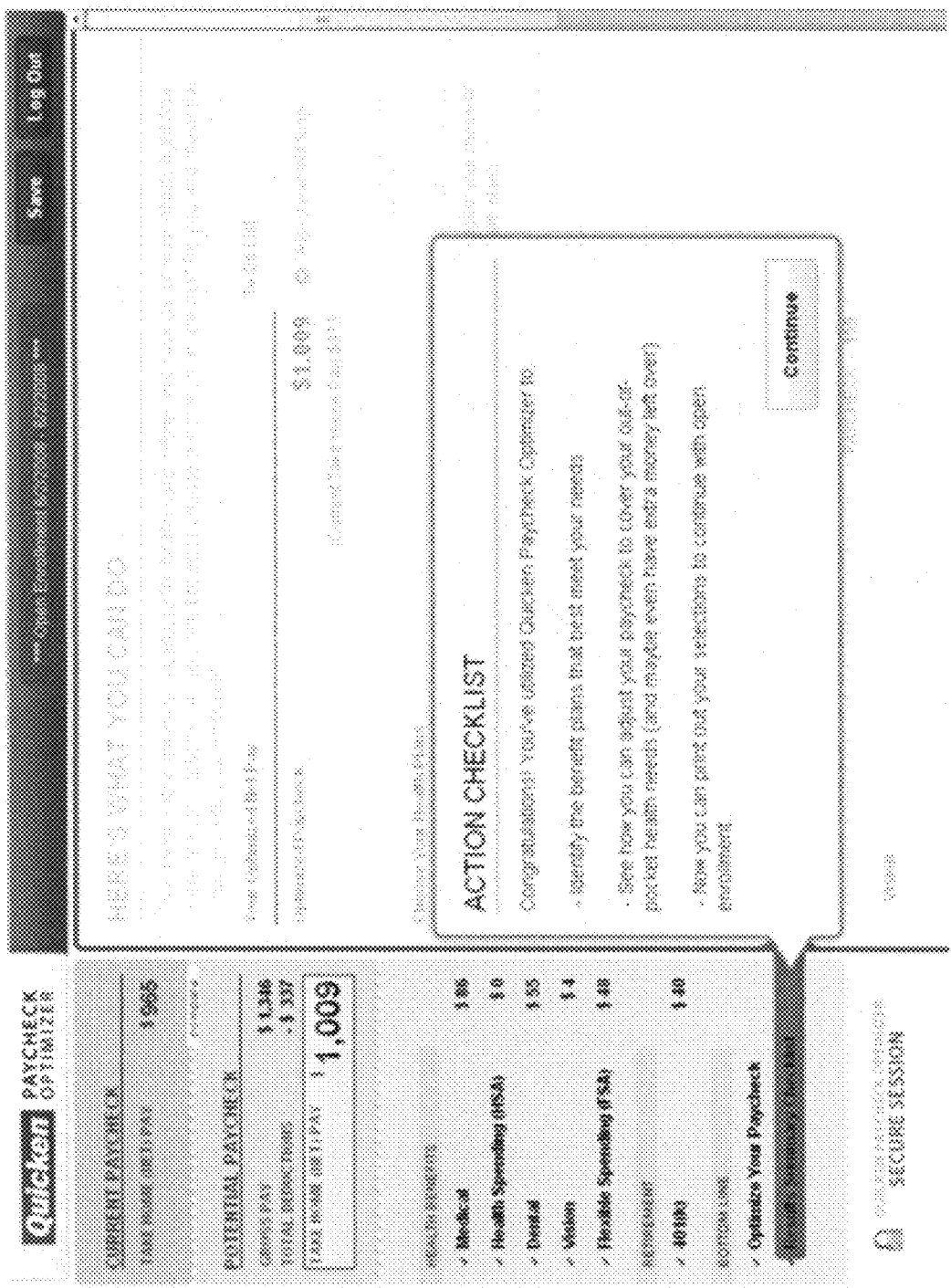

In FIG. 3I, the user interface offers a checklist the employee may print and use to initiate the changes selected during use of the tool. The checklist may encompass any level of detail, such as a list of changes or selections the employee has made, detailed step-by-step instructions for completing any necessary forms or applications (e.g., a W-4 withholding form, an application to open an Individual Retirement Account), or something in between.

As described previously, the checklist, instructions or other information regarding the employee's choices may be saved electronically (e.g., by the facilitator that provided the tool, by the employee's employer or an aggregator associated with the employer) and/or forwarded to an entity that can help the employee effect the desired changes (e.g., a human resources department), a benefits provider, etc.

Figure 3J:
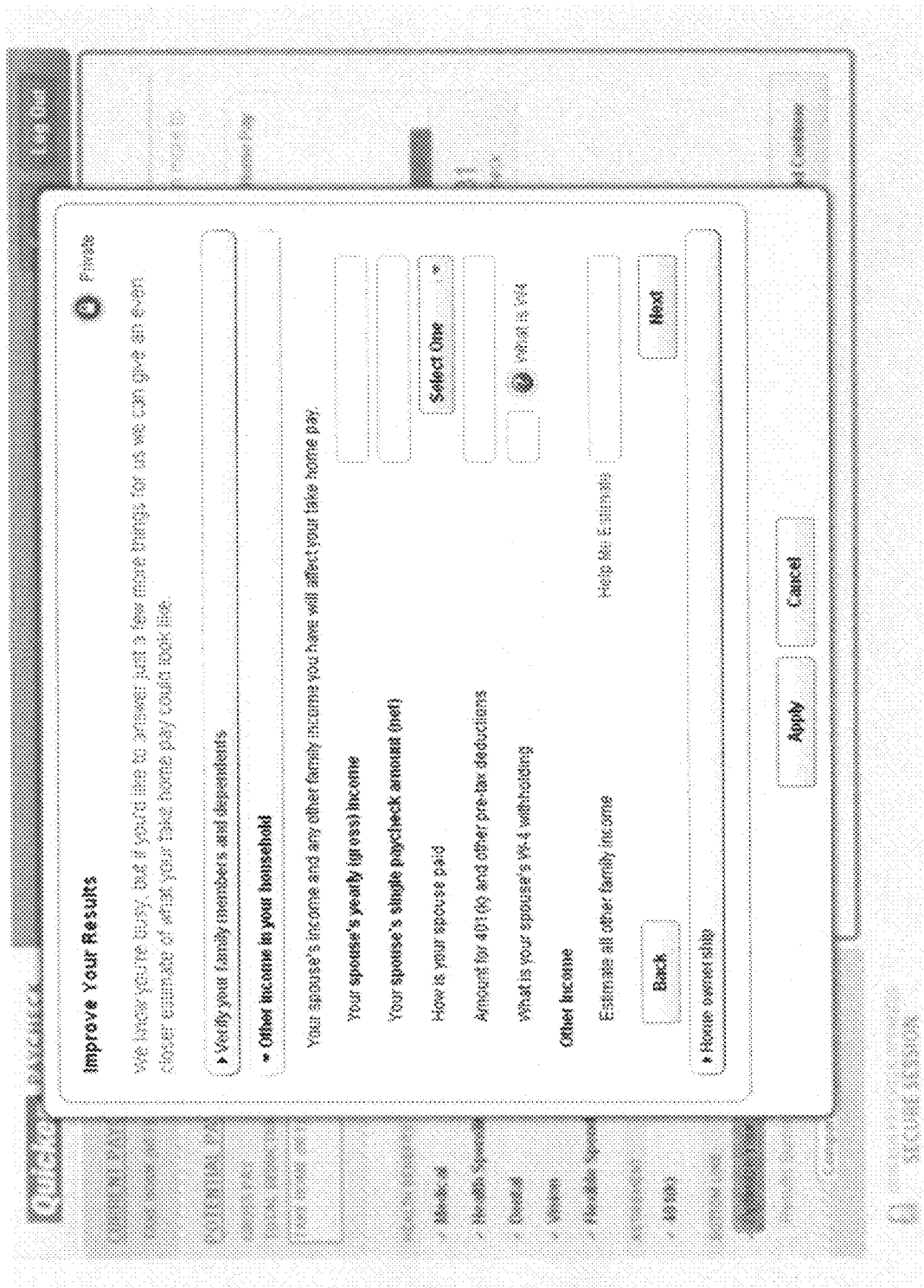

In FIG. 3J, the tool asks the employee to verify and/or update his personal/demographic information. In the illustrated embodiment of the invention, three areas are investigated: (a) Family members and dependents, (b) Other household income and (c) Home ownership.

In FIG. 3J the "Other income" tab is opened and the employee may submit information regarding his spouse's income, pre-tax deductions, W-4 withholding, etc. In the "Family members" tab he may view/update data regarding his family (e.g., names, birthdates), and the "Home ownership" tab may invite the employee to indicate how much he pays for mortgage interest and property taxes in a year (if he owns a home).

In FIGS. 3A-J the graphical user interface comprises separate windows for paycheck summary, current take-home pay, deduction categories, and details, but does not comprise a separate general information window (e.g., window 230 of FIG. 2). In other embodiments of the invention, any or all of these windows may be collocated or divided.

Figure 4:
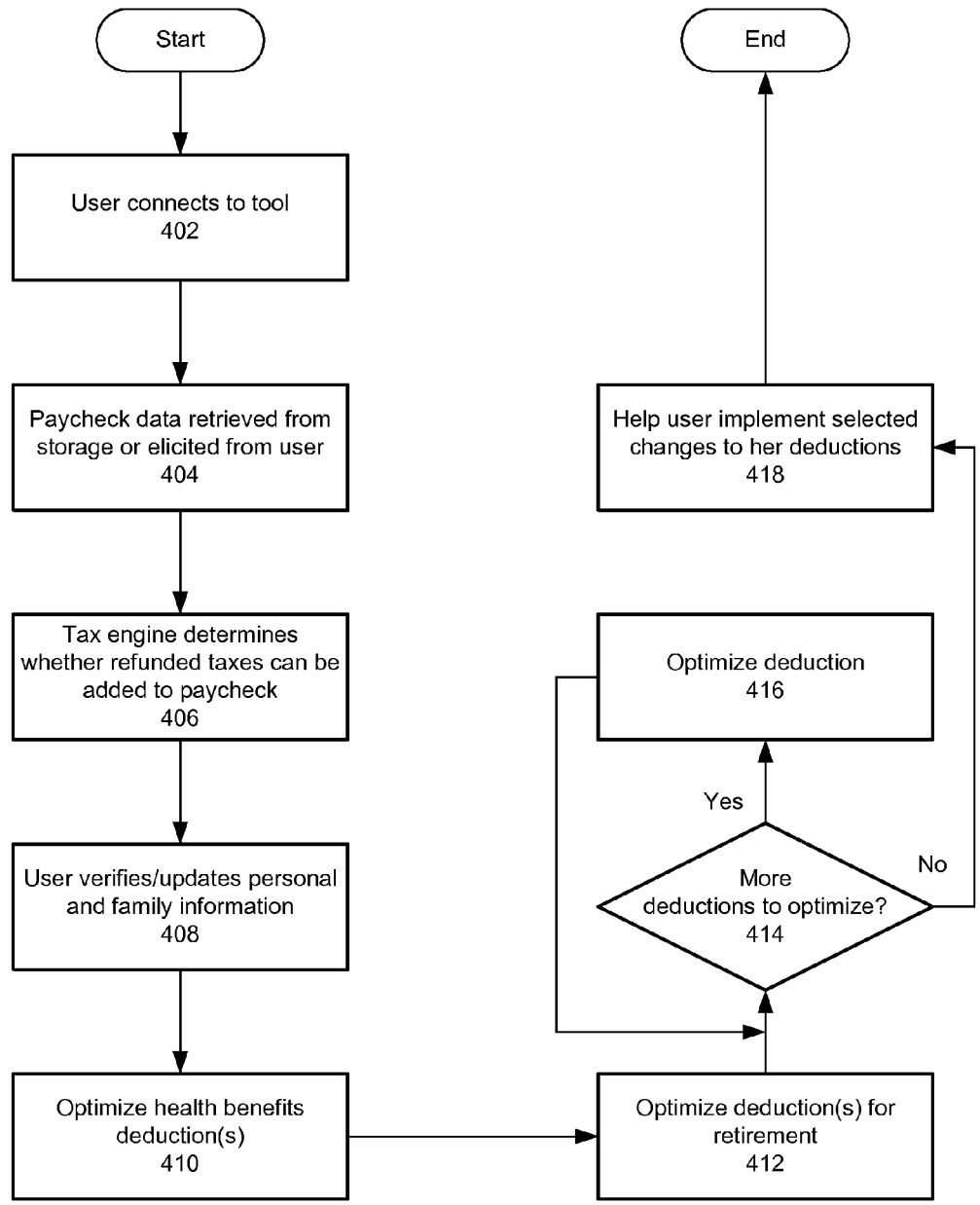
FIG. 4 is a flowchart illustrating one method of facilitating management of paycheck deductions in accordance with some embodiments of the invention.

FIG. 4 is a flowchart demonstrating a method of facilitating the management of an employee's (or other payee's) paycheck, according to an embodiment of the invention.

In operation 402, a user (e.g., a recipient of a paycheck) opens or connects to a tool for facilitating management or optimization of her paycheck. This may involve opening her browser and navigating to a particular URL (Uniform Resource Locator) or network address (e.g., within her employer's intranet, on the Internet), or invoking an application that comprises or connects her to the tool. As part of operation 402, the user may be required to authenticate herself via a login name and password or some other security mechanism.

In the illustrated embodiment of the invention, the tool comprises a graphical user interface configured to guide the user through the process of examining her paycheck deductions, choosing different benefits and determining how a different array of benefits and deductions would likely affect her paycheck.

In operation 404, paycheck data is obtained after the user is identified (e.g., through a login process). In some embodiments of the invention, the data are retrieved from a third party benefits company, the employee's employer, benefits providers and/or other sources separate from the user.

These embodiments may be particularly well suited for use by employees of organizations that have retained a third party benefits company to help them manage the benefits provided to their employees. Such benefit companies typically have systems and processes in place to collect various benefits information (e.g., details of health insurance plans, investment options, enrollment forms for various benefits), and can therefore be called upon to provide useful information for helping employees optimize their paycheck deductions.

In some other embodiments of the invention, some or all of the data to be used by the tool in this session is received from the user. These embodiments may be well suited for self-employed individuals, for employees of small organizations, and other users who cannot (or do not wish to) rely on paycheck data from other sources.

In these embodiments, data provided by the user and/or generated by the tool during this session may be stored by the tool at a facilitator's site or downloaded for local storage by the user. The facilitator may, but need not, be associated with the user's employer or a provider of the tool.

A summary of the user's paycheck is presented, which may show her gross pay, deductions and the resulting net pay. The amount of the deductions may be lumped together to make the summary more concise, or may be enhanced by separating them into categories (e.g., taxes, health benefits, retirement contributions, charity donations).

In operation 406, the tool examines available tax information for the user (e.g., a past tax return, withholding reported on a W-4 form) to determine whether too much money has been deducted from her paycheck for paying taxes. For example, if the user has received refunds on one or more of her most recent tax returns, the tool may invoke a tax engine to calculate how her tax liability would likely change if her W-4 withholding was increased. Or, the tax engine may quickly calculate the user's likely tax liability for the current tax year. The tool will display for the user an updated summary if additional money has been found to increase her net pay.

In operation 408, the tool invites the user to review and/or update her personal information. This may include information regarding her family (e.g., names and ages of dependents), home address and/or other demographic data. In some embodiments of the invention, if the user changes some key data, such as to indicate she is now married or has a child, the tool may alter its behavior as necessary to accommodate the new data. For example, she may be urged (or urged more strenuously) to select a more comprehensive medical insurance plan, to change the beneficiaries of her life insurance, and so on.

In operation 410, the tool helps the user optimize her deductions for health benefits, which may include insurance plans for medical, dental and vision health, an FSA (Flexible Spending Account) or other instrument for reducing health care expenses, and/or other elements.

In one implementation, for each type of health benefit, the user is invited to describe or select parameters defining the level of need for the particular benefit. For example, she may be asked to describe the medical (or dental or vision) health and conditions of herself and her dependents and the amount and nature of care sought over the past year (or expected to be needed in the coming year).

She may also be asked for the factor(s) most important to her regarding the benefits. Illustratively, if she is young, single and in good health, she may wish to minimize paycheck deductions for health insurance premiums. Contrarily, if she has one or more dependents not covered by other health plans, she may be willing to pay higher premiums, but may wish to keep out-of-pocket expenses low (e.g., for co-pay amounts for doctor visits, for prescriptions).

For each health benefit, she is presented with any number of insurance plans for which she is eligible. The presentation of plans may be sorted based on the factors she selected as being most important. Each plan that is offered may include a description of benefits (and/or a link to a comprehensive description of benefits) and identify how much it will cost her—in terms of monthly deductions, estimated co-pay amounts, estimated yearly costs and/or other amounts. As she selects different plans or benefits, the tool may update its display of her paycheck summary so that she can immediately see the real-world effect of her choices.

In operation 412, another category of benefits is opened, such as retirement contribution. In this category the user is invited to select a level of contribution to an existing retirement account (e.g., IRA, 401K), or may be prompted to select a type of retirement account to open. She will be able to immediately see how her paycheck will be affected by her level of contribution, and may also be presented with information predicting how her retirement account will grow over time.

In operation 414, the tool determines whether other categories of deductions remain to be configured, or awaits the user's selection of another deduction to configure. If no other action is needed or desired, the method advances to operation 418.

Otherwise, in operation 416 the tool assists the user in configuring the next deduction (e.g., housing, stock purchase plan, charitable donation) and then returns to operation 414 to determine if there is more work to do.

In operation 418, the tool may offer the user a checklist of action she should take to implement her desired changes (e.g., fill out a new W-4 form, change her medical insurance during an open enroll period), or may initiate some or all of the necessary actions electronically. For example, the tool may be configured to interface with her employer's human resources department to prepare a new W-4 statement, to present the user with an electronic form for opening a 401K account (and possibly submit the form), to interact with external benefits providers to make or initiate changes, etc. The illustrated method ends after operation 418.

The environment in which a present embodiment of the invention is executed may incorporate a general-purpose computer or a special-purpose device such as a hand-held computer. Details of such devices (e.g., processor, memory, data storage, display) may be omitted for the sake of clarity.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules may include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A method of facilitating optimization of a payee's paycheck deductions, the method comprising:
   receiving a current net pay of the payee, wherein the current net pay is based on the payee's paycheck;
   receiving a change in tax withholding;
   presenting a payee with options for configuring a deduction, wherein the deduction is one of multiple deductions associated with the paycheck;
   receiving a selection of an option from the payee;
   receiving an indication of other household income from the payee, wherein other household income comprises house income other than from a payer of the paycheck;
   determining, by computer, a potential net pay of the payee, based on the change in the tax withholding, the received selection from the payee, and the received indication of other household income;
   simultaneously displaying the current net pay and the potential net pay; and
   receiving a selection from the payee to implement the option.

2. The method of claim 1, wherein receiving the current net pay of the payee comprises:
   retrieving paycheck data related to the payee from one or more data sources, including a third party configured to aggregate paycheck data for employees of the employee's employer.

3. The method of claim 1, further comprising:
   retrieving paycheck data related to the payee from providers of benefits associated with the multiple deductions.

4. The method of claim 1, wherein:
   the multiple deductions include deductions for one or more categories of health benefits; and
   configuration options for a deduction comprise insurance plans for the health benefit categories.

5. The method of claim 1, wherein the multiple deductions include deductions for one or more of:
   health benefits;
   retirement;
   investments other than for retirement;
   housing; and
   contributions.

6. The method of claim 1, wherein said displaying the current net pay comprises displaying a summary of the paycheck, said summary comprising the net pay.

7. The method of claim 1, wherein said determining comprises invoking a tax engine that comprises code from a program configured to calculate the payee's income tax.

8. A non-transitory computer-readable medium storing instructions that, when executed by a computer, cause the computer to perform a method of facilitating optimization of a payee's paycheck deductions, the method comprising:
   receiving a current net pay of the payee, wherein the current net pay is based on the payee's paycheck;
   receiving a change in tax withholding;
   presenting a payee with options for configuring a deduction, wherein the deduction is one of multiple deductions associated with the paycheck;
   receiving a selection of an option from the payee;
   receiving an indication of other household income from the payee, wherein other household income comprises house income other than from a payer of the paycheck;
   determining, by computer, a potential net pay of the payee, based on the change in the tax withholding, the received selection from the payee, and the received indication of other household income;
   simultaneously displaying the current net pay and the potential net pay; and
   receiving a selection from the payee to implement the option.

9. The method of claim 1, further comprising:
   determining an impact that changing a deduction or tax withholding will have on the paycheck; and
   providing a recommendation based on the determined impact.

* * * * *